(12) United States Patent
Yonemoto

(10) Patent No.: US 11,297,193 B2
(45) Date of Patent: Apr. 5, 2022

(54) DOCUMENT CONVEYANCE APPARATUS

(71) Applicant: KYOCERA Document Solutions Inc., Osaka (JP)

(72) Inventor: Satoru Yonemoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/206,691

(22) Filed: Mar. 19, 2021

(65) Prior Publication Data

US 2021/0329138 A1   Oct. 21, 2021

(30) Foreign Application Priority Data

Apr. 20, 2020  (JP) .............................. JP2020-074523

(51) Int. Cl.
*H04N 1/00*            (2006.01)

(52) U.S. Cl.
CPC ..... *H04N 1/00602* (2013.01); *H04N 1/00615* (2013.01); *H04N 1/00604* (2013.01)

(58) Field of Classification Search
CPC ........... G03G 21/1814; G03G 21/1821; G03G 15/0886; G03G 21/1647; G03G 21/1633; G03G 21/1676; G03G 21/1842; G03G 15/0896; G03G 15/0868; G03G 15/0872; G03G 2215/0678; G03G 15/0867; G03G 15/0879; G03G 21/1817; G03G 2215/0668; G03G 2215/0692; G03G 2221/1684; G03G 21/1853; G03G 15/2028; G03G 15/6508; G03G 15/6511; G03G 15/6529; G03G 15/6573; G03G 21/1628; G03G 21/1638; G03G 21/1671; G03G 21/169; G03G 21/185; G03G 21/20; G03G 2215/00396; G03G 2215/00734; G03G 2215/067; G03G 2221/1687; G03G 2221/1869; G03G 15/60; G03G 15/6502; G03G 21/1623; B65H 3/0684; B65H 2201/01; B65H 2220/03;
(Continued)

(56) References Cited

U.S. PATENT DOCUMENTS 4,954,847 A * 9/1990 Murata .................... B65H 5/16
                                                                  399/374
5,061,961 A * 10/1991 Jacobs ............... G03G 21/1671
                                                                  399/116
(Continued)

FOREIGN PATENT DOCUMENTS

JP           2003-087464 A       3/2003

*Primary Examiner* — Negussie Worku
(74) *Attorney, Agent, or Firm* — Studebaker & Brackett PC

(57) ABSTRACT

A document conveyance apparatus includes a conveyance part, a document cover, a stopper and a restriction member. One end of the stopper is rotatably supported by the document cover, and the other end of the stopper is movably supported by an elongated hole formed in the conveyance part. The stopper supports the document cover with respect to the conveyance part at a fixed opening angle. The restriction member is attached to the elongated hole. When the restriction member is attached to the elongated hole on the side of the one end edge, a moving amount of the other end of the stopper along the elongated hole at a time of opening the document cover is restricted to be short so that the document cover is supported at an opening angle smaller than the fixed opening angle.

4 Claims, 11 Drawing Sheets

(58) Field of Classification Search
CPC .............. B65H 2801/06; B65H 1/266; B65H 2402/31; B65H 1/04; B65H 2220/02; B65H 2403/512; B65H 2513/512; B65H 2513/514; B65H 3/0669; B65H 2511/10; B65H 2511/212; B65H 2511/22; B65H 2511/524; B65H 2701/1311; B65H 2701/1313; B65H 7/20; B65H 2403/53; B65H 2801/39; B65H 7/06; B65H 2220/11; B65H 2403/514; B65H 2405/12; B65H 2405/311; B65H 2407/20; B65H 2601/11; B65H 2701/139; B65H 2701/1829; B65H 2801/12; B65H 3/0653; B65H 3/34; B65H 3/5215; B65H 3/5261; B65H 3/5284; B65H 3/56; B65H 7/00; B65H 7/02; B65H 2301/4222; B65H 2402/441; B65H 2405/324; B65H 16/00; B65H 1/28; B65H 20/02; B65H 2301/4228; B65H 2301/4493; B65H 2301/51256; B65H 2301/5144; B65H 2402/32; B65H 2402/341; B65H 2402/45; B65H 2402/46; B65H 2402/542; B65H 2402/545; B65H 2403/421; B65H 2403/481; B65H 2403/72; B65H 2403/722; B65H 2403/724; B65H 2404/133; B65H 2404/144; B65H 2404/1441; B65H 2404/1442; B65H 2404/1521; B65H 2404/253; B65H 2404/2612; B65H 2404/2614; B65H 2404/2693; B65H 2404/6111; B65H 2404/623; B65H 2404/742; B65H 2405/11164; B65H 2406/42; B65H 2511/514; B65H 2601/255; B65H 2601/322; B65H 2601/324; B65H 2801/127; B65H 29/58; B65H 3/0607; B65H 3/063; B65H 3/0661; B65H 3/0676; B65H 5/023; B65H 5/062; B65H 5/068; B65H 5/26; B65H 7/12; B65H 7/125; B65H 1/14; B65H 2301/4212; B65H 2402/64; B65H 2403/42; B65H 2403/513; B65H 2404/1421; B65H 2404/722; B65H 2407/21; B65H 2511/20; B65H 2511/52; B65H 2513/40; B65H 2513/50; B65H 2513/53; B65H 2601/125; B65H 2601/26; B65H 2601/321; B65H 2601/521; B65H 2601/524; B65H 29/50; B65H 3/0615; H04N 2201/0471; H04N 2201/04724; H04N 2201/04734; H04N 1/00567; H04N 1/00204; H04N 1/00602; H04N 1/0062; H04N 1/00687; H04N 1/00732; H04N 1/00734; H04N 1/00777; H04N 1/00782; H04N 1/107; H04N 1/1075; H04N 1/1077; H04N 2201/0049; H04N 2201/0081; H04N 1/00543; H04N 1/00551; H04N 1/00588; H04N 1/00591; H04N 1/0061; H04N 1/00631; H04N 1/1215; H04N 1/2034; H04N 1/00604; H04N 1/00615; H04N 1/00655
USPC ...................................................... 358/498
See application file for complete search history.

(56) References Cited

U.S. PATENT DOCUMENTS

| | | | | |
|---|---|---|---|---|
| 5,203,550 | A * | 4/1993 | Kawano | B42C 1/125 270/58.14 |
| 5,363,184 | A * | 11/1994 | Matsuo | G03G 15/60 271/7 |
| 5,412,462 | A * | 5/1995 | Matsuo | G03G 15/60 271/4.08 |
| 7,663,658 | B2 * | 2/2010 | Murano | G03G 21/1619 347/245 |
| 2015/0344247 | A1 * | 12/2015 | Lee | H04N 1/00551 271/117 |
| 2017/0160697 | A1 * | 6/2017 | Sato | G03G 21/1633 |
| 2021/0221633 | A1 * | 7/2021 | Kuroda | B65H 3/0684 |

* cited by examiner

L ←→ R

L ←→ R

DOCUMENT CONVEYANCE APPARATUS

INCORPORATION BY REFERENCE

This application is based on and claims the benefit of priority from Japanese patent application No. 2020-074523 filed on Apr. 20, 2020, which is incorporated by reference in its entirety.

BACKGROUND

The present disclosure relates to a document conveyance apparatus including a cover opening and closing a document conveyance path.

The document conveyance apparatus includes a cover which opens and closes a document conveyance path, and it becomes possible to treat a sheet jamming on the conveyance path by opening the cover. Such a document conveyance apparatus is sometimes placed on an image forming apparatus. Further, an option apparatus such as a post-processing apparatus may be installed adjacent to the image forming apparatus.

The document conveyance apparatus may include a stopper which restricts the cover at a fixed opening angle. The stopper is configured such that when the cover is opened or closed, the stopper slides while sandwiching a projection provided on the document conveyance part, for example. By making a gap for sandwiching the projection narrower than a width of the projection, a load due to friction is generated at the time of opening and closing the cover, and an operational feeling at the time of opening and closing the cover can be obtained.

However, the above document conveyance apparatus does not consider that the cover is maintained at a desirable opening angle.

SUMMARY

In accordance with a first aspect of the present disclosure, a document conveyance apparatus includes a conveyance part, a document cover, a stopper and a restriction member. The conveyance part is configured to have a conveyance path. The document cover is supported by the conveyance part, and opens and closes the conveyance path. One end of the stopper is rotatably supported by one of the conveyance part and the document cover, and the other end of the stopper is movably supported by an elongated hole formed in the other of the conveyance part and the document cover. The stopper supports the document cover with respect to the conveyance part at a fixed opening angle when the other end is locked to one end edge of the elongated hole. The restriction member is attached to the elongated hole on a side of the one end edge. When the restriction member is attached to the elongated hole on the side of the one end edge, a moving amount of the other end of the stopper along the elongated hole at a time of opening the document cover is restricted to be short so that the document cover is supported at an opening angle smaller than the fixed opening angle.

In accordance with a second aspect of the present disclosure, a document conveyance apparatus includes a conveyance part, a document cover and a stopper. The conveyance part is configured to have a conveyance path. The document cover is supported by the conveyance part, and opens and closes the conveyance path. One end of the stopper is rotatably supported by one of the conveyance part and the document cover, and the other end of the stopper is movably supported by an elongated hole formed in the other of the conveyance part and the document cover. The stopper supports the document cover with respect to the conveyance part at a fixed opening angle when the other end is locked to one end edge of the elongated hole. When a position where the one end of the stopper is rotatably supported is shifted to a position far from the elongated hole, a moving amount of the other end of the stopper along the elongated hole at a time of opening the document cover is restricted to be short so that the document cover is supported at an opening angle smaller than the fixed opening angle.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a document conveyance apparatus according to one embodiment in the present disclosure will be described.

Figure 1:
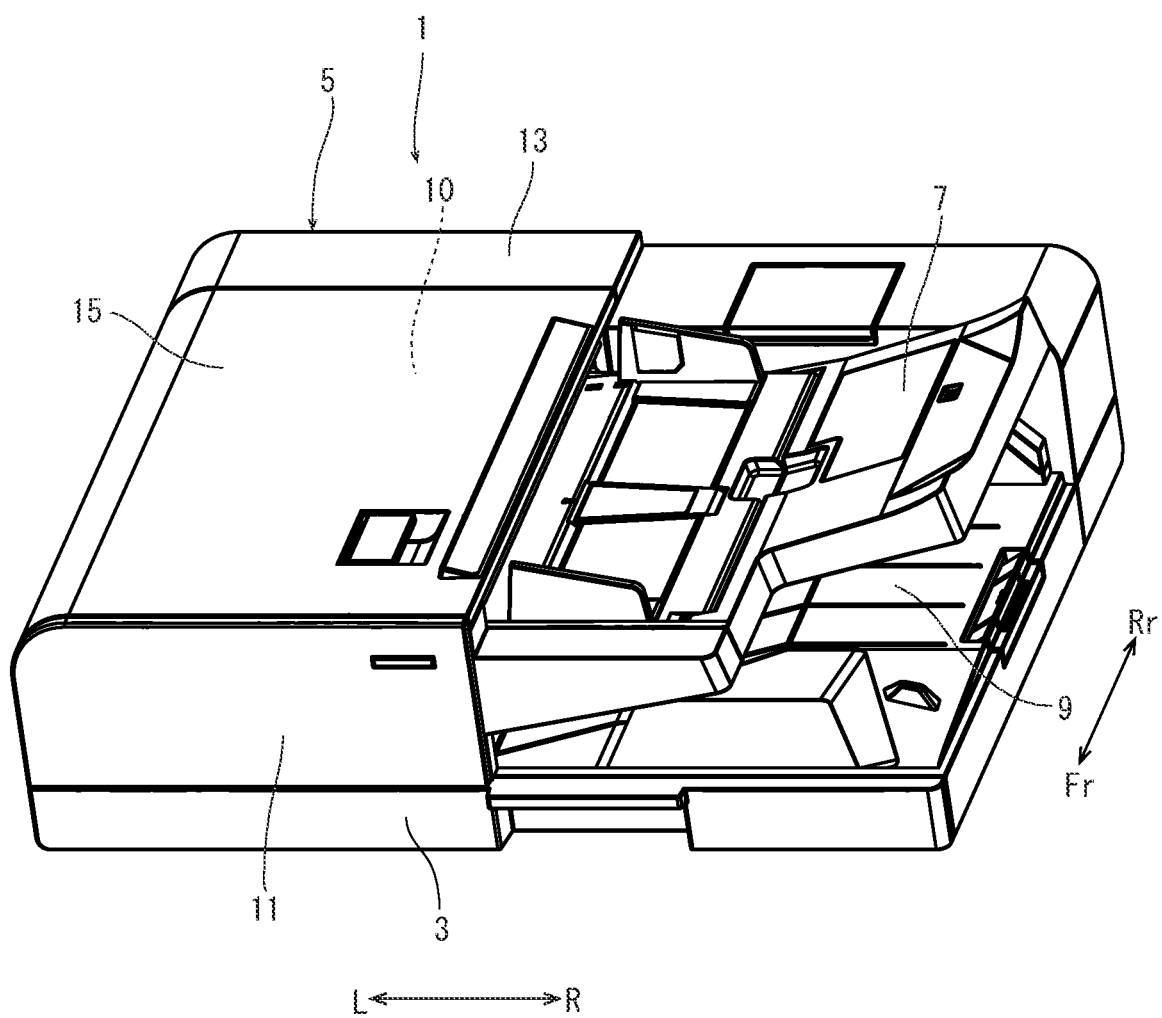
FIG. 1 is a perspective view showing a document conveyance apparatus according to one embodiment of the present disclosure.

With reference to FIG. 1, the document conveyance apparatus 1 will be described. FIG. 1 is a perspective view showing the document conveyance apparatus 1. Fr, Rr, L and R marked in each figure show a front side, a rear side, a left side and a right side of the document conveyance apparatus 1, respectively.

The document conveyance apparatus 1 is placed on an upper face of a document reading apparatus (not shown). The document conveyance apparatus 1 conveys a document automatically, and the document reading apparatus reads an image of the conveyed document. The document conveyance apparatus 1 and the document reading apparatus are placed on an upper face of an image forming apparatus, for example. In the embodiment, a case where an option apparatus such as a post-processing apparatus may be installed on the left side of the image forming apparatus will be described.

The document conveyance apparatus 1 includes a base part 3, a conveyance part 5 configure to convey the document, a sheet feeding tray 7 on which the document is placed, a discharge tray 9 on which the document after conveyed in the conveyance part 5 is stacked, and a document cover 15.

The conveyance part 5 is provided on a left upper face of the base part 3. The conveyance part 5 includes a main body part 10, a front cover 11 covering a front face of the main body part 10 and a rear cover 13 covering a rear face of the main body part 10. On a right side face of the main body part 10, a document reception port and a document discharge port (both are not shown) are formed on the upper portion and the lower portion. In the main body part 10, a part of a conveyance path along which the document is conveyed from the reception port to the discharge port is formed.

The sheet feeding tray 7 is supported by the main body part 10 below the reception port. The discharge tray 9 is formed on a right upper face of the base part 3 below the discharge port.

The document placed on the sheet feeding tray 7 is fed to the conveyance path through the reception port, conveyed along the conveyance path, discharged through the discharge port, and stacked on the discharge tray 9.

The front cover 11 is erectly formed along a left half portion of a front edge of the base part 3. The rear cover 13 is erectly formed along a left half portion of a rear edge of the base part 3.

Figure 2:
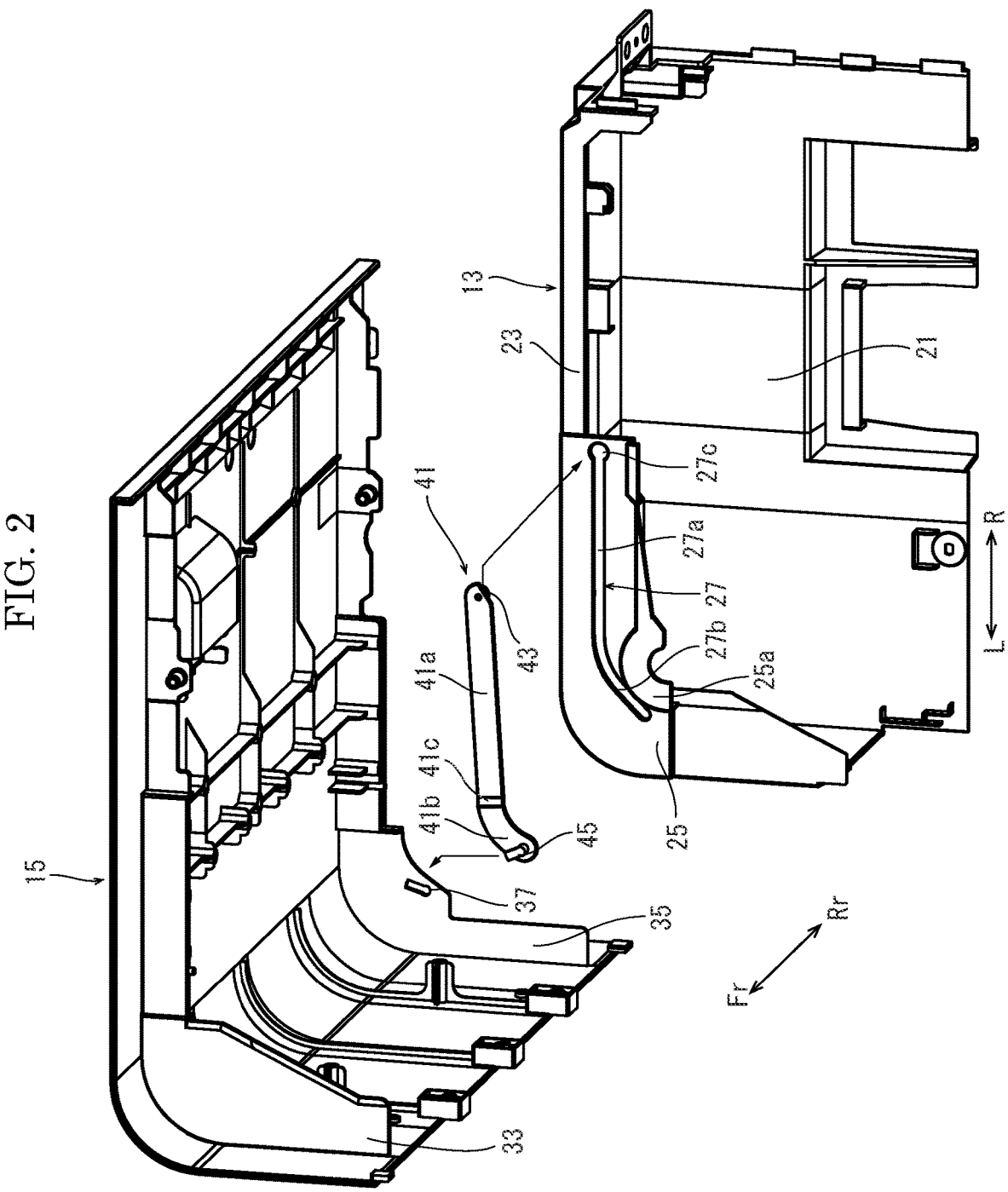
FIG. 2 is a perspective view showing a rear cover, a document cover and a stopper, in the document conveyance apparatus according to the embodiment of the present disclosure.

With reference to FIG. 2, the rear cover 13 and the document cover 15 will be described. FIG. 2 is a perspective view showing the rear cover 13, the document cover 15 and a stopper 41.

The rear cover 13 includes a rear wall 21, an inner wall 25 facing the rear wall 21 on the front side of the rear wall 21, and an outer wall 23 formed between the rear wall 21 and the inner wall 25. The rear wall 21 has a horizontally long rectangular shape, and the left upper corner portion is curved in an arc shape. The inner wall 25 is formed along the left upper corner portion of the rear wall 21.

The inner wall 25 is formed with an elongated hole 27. The elongated hole 27 has a straight portion 27a extending substantially horizontally in the left-and-right direction, and an inclined portion 27b inclined downward to the left side from the left end of the straight portion 27a. At the right end of the straight portion 27a, a circular portion 27c having a diameter larger than a width of the elongated hole 27 is formed. In the inner wall 25, a substantially semicircular thick portion 25a is formed below the inclined portion 27b of the elongated hole 27.

The document cover 15 has an L-shaped side shape as viewed from the front side of the document conveyance apparatus 1 so as to cover the upper face and the left face of the main body part 10 of the conveyance part 5. Along the curved portions of the front edge and the rear edge of the document cover 15, front and rear inner wall 33 and 35 are formed respectively. On the inner face of the document cover 15, an upper guide plate (not shown) for forming an upper guide face of the conveyance path is supported. The lower end of the document cover 15 is rotatably supported by a rotating shaft (not shown) disposed between the front and rear covers 11 and 13. When the document cover 15 is turned downward, the conveyance path is formed between the upper guide plate and the main body part 10 of the conveyance part 5. When the document cover 15 is turned upward, the conveyance path is exposed, and a sheet jammed in the main body 10 can be removed.

A keyhole-shaped fixing hole 37 is formed in an inner portion of the rear inner wall 35.

The document cover 15 and the rear cover 13 are coupled with a stopper 41 so that the document cover 15 is supported with respect to the rear cover 13 at a predetermined opening angle.

Figure 3:
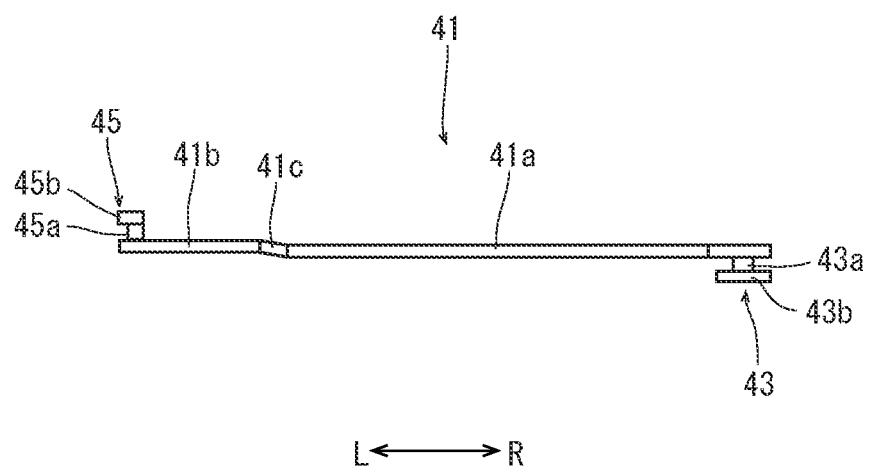
FIG. 3 is a side view showing the stopper, in the document conveyance apparatus according to the embodiment of the present disclosure.

With reference to FIG. 2 and FIG. 3, the stopper 41 will be described. FIG. 3 is a side view showing the stopper 41.

The stopper 41 is an elongated plate-like member, and has a straight portion 41a and an arc-shaped curved portion 41b connected to one end of the straight portion 41a through an inclined portion 41c. On the rear face of the end portion of the straight portion 41a, a moving side protrusion 43 is protruded. As shown in FIG. 3, the moving side protrusion 43 has a shaft portion 43a and a disk-shaped head portion 43b having a diameter larger than that of the shaft portion 43a. On the front face of the end portion of the curved portion 41b, a fixing side protrusion 45 is protruded. The fixing side protrusion 45 has a shaft portion 45a and a locking portion 45b bent substantially at right angles to the shaft portion 45a.

With reference to FIG. 2 again, the stopper 41 is disposed between the inner wall 25 of the rear cover 13 and the rear inner wall 35 of the document cover 15, and the moving side protrusion 43 is supported by the elongated hole 27 of the rear cover 13, and the fixing side protrusion 45 is supported by the fixing hole 37 of the document cover 15. In detail, the head portion 43b (see FIG. 3) of the moving side protrusion 43 is passed through the circular portion 27c of the elongated hole 27 from the front side, and the shaft portion 43a is engaged with the straight portion 27a of the elongated hole 27. Thus, the moving side protrusion 43 is capable of moving along the elongated hole 27. The moving side protrusion 43 is prevented from removing from the elongated hole 27 by the head portion 43b. The fixing side protrusion 45 is passed through the fixing hole 37 of the document cover 15 from the rear side, and the locking portion 45b (see FIG. 3) is locked to the inner wall 35. Thus, the stopper 41 turns around the shaft portion 45a of the fixing side protrusion 45.

Figure 4A:
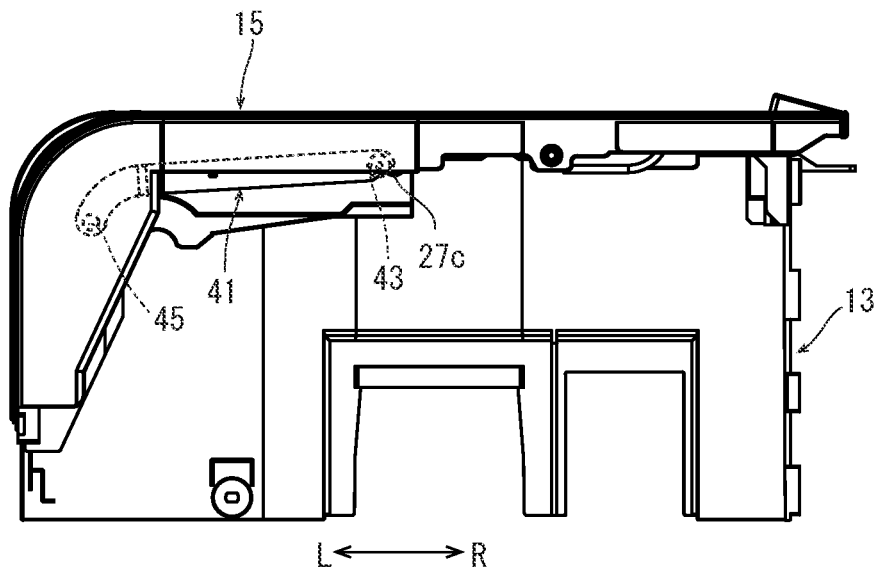
FIG. 4A is a front view showing the document cover in a closing position, in the document conveyance apparatus according to the embodiment of the present disclosure.
Figure 4B:
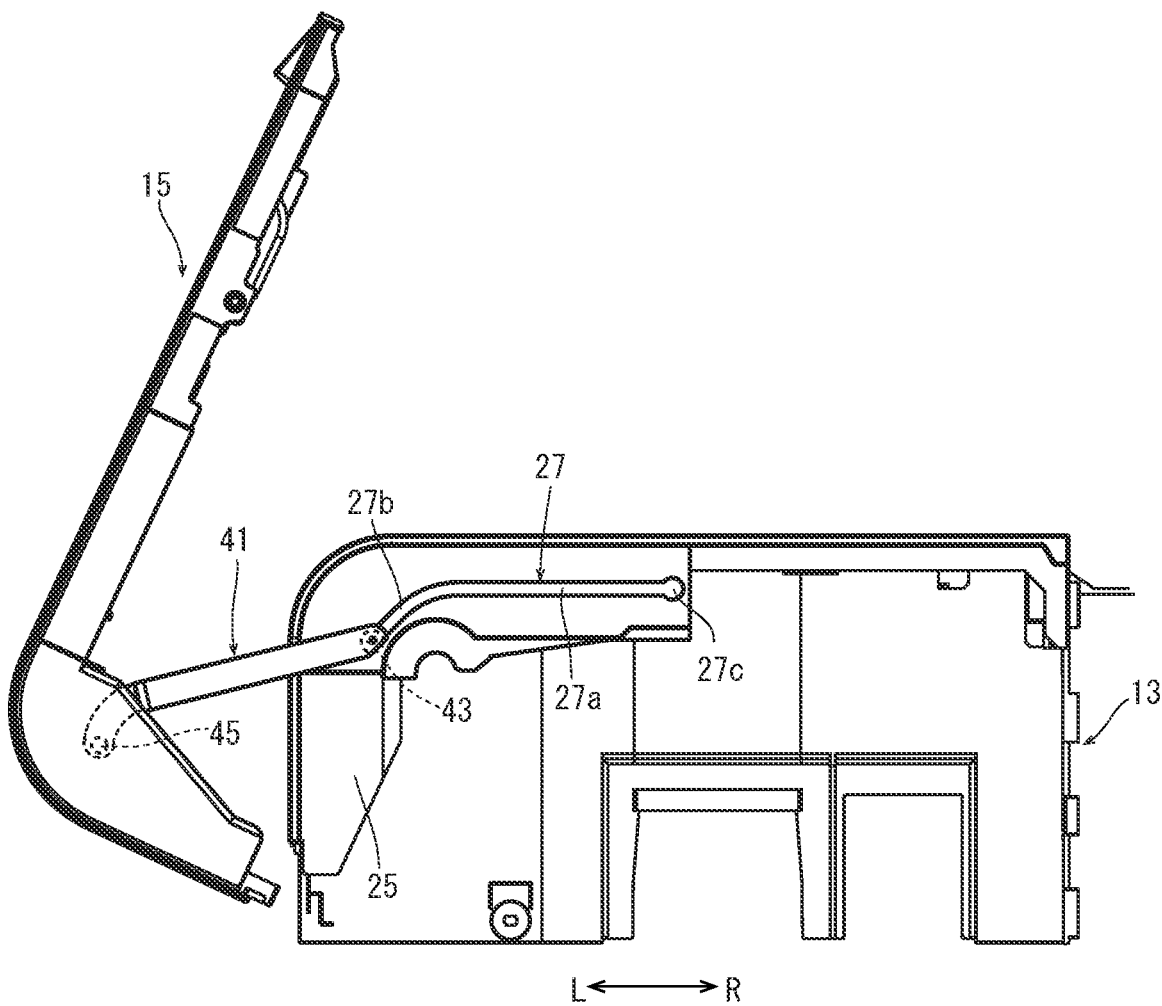
FIG. 4B is a front view showing the document cover in an opening position, in the document conveyance apparatus according to the embodiment of the present disclosure.

An operation of the stopper 41 will be described with reference to FIG. 4A and FIG. 4B. FIG. 4A shows the document cover 15 in an opening state and FIG. 4B shows the document cover 15 in a closing state.

As shown in FIG. 4A, in a state where the document cover 15 is closed, the moving side protrusion 43 of the stopper 41 is positioned on the left side of the circular portion 27c of the elongated hole 27 of the rear cover 13. When the document cover 15 is turned upward, the stopper 41 is pulled by the document cover 15 to which the fixing side protrusion 45 is engaged, and moved leftward, and the moving side protrusion 43 is moved leftward in the elongated hole 27. At this time, the stopper 41 is turned around the shaft portion 45a of the fixing side protrusion 45 (see FIG. 3). Then, as shown in FIG. 4B, when the moving side protrusion 43 is locked to the left end edge of the elongated hole 27, the turning of the document cover 15 is restricted, and the document cover 15 is supported at a predetermined opening angle. At the predetermined opening angle, because a gravity center of the document cover 15 is positioned on the left side of the rotating shaft of the document cover 15, the document cover 15 is not closed by its own weight.

By the way, when the optional apparatus such as a post-processing apparatus is installed adjacent to the image forming apparatus as described above, the opened document cover 15 may interfere with them. Therefore, the document conveyance apparatus 1 is configured to support the document cover 15 relative to the rear cover 13 at an angle smaller than the predetermined opening angle. The document conveyance apparatus 1 of the present embodiment is provided with a restriction means for restricting a moving length of the moving side protrusion 43 of the stopper 41 along the elongated hole 27 at the time of the turning of the document cover 15 to be short so as to support the document cover 15 relative to the rear cover 13 at an opening angle smaller than the predetermined opening angle.

Figure 5A:
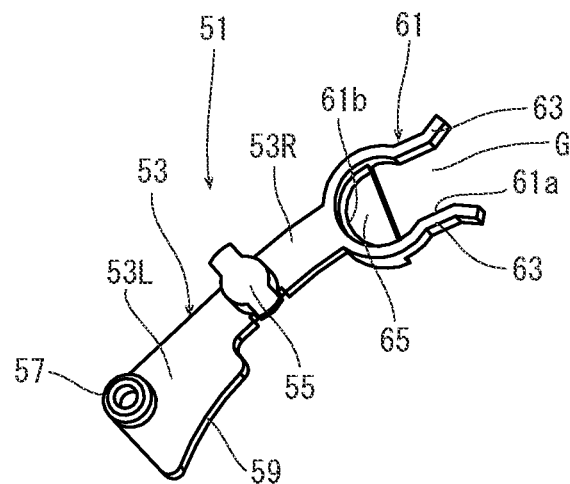
FIG. 5A is a perspective view showing a restricting member as a first restricting means, in the document conveyance apparatus according to the embodiment of the present disclosure.
Figure 5B:
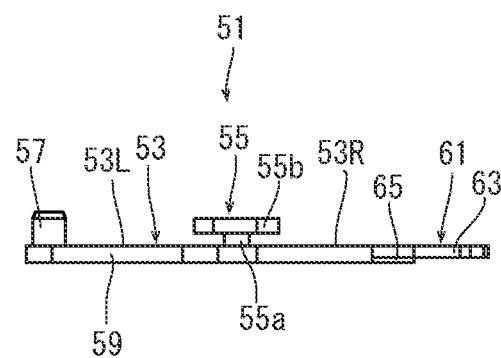
FIG. 5B is a side view showing the restricting member as a first restricting means, in the document conveyance apparatus according to the embodiment of the present disclosure.

The restriction means according to a first example will be described with reference to FIG. 2, FIG. 5A and FIG. 5B. FIG. 5A is a perspective view showing a restriction member 51 as the restriction means according to the first example, and FIG. 5B is a side view of the restriction member 51.

The restriction means according to the first example is a restriction member 51 attached to the elongated hole 27 (see FIG. 2) of the rear cover 13. As shown in FIG. 5A, the restriction member 51 has a restriction plate 53 having a plate-like shape along the inclined portion 27b of the elongated hole 27 (see FIG. 2). On the center portion of the front face of the restriction plate 53, a retaining part 55 is formed. As shown in FIG. 5B, the retaining part 55 has a shaft portion 55a and a locking piece 55b. The shaft portion 55a is erectly formed on the front face of the restriction plate 53, and the locking piece 55b is turnable around the shaft portion 55a. The locking piece 55b has almost a rectangular shape in a plan view, its length in a longer side direction is longer than the width of the elongated hole 27 and its length in a shorter side direction is smaller than the width of the elongated hole 27.

On the front face of a left end portion 53L of the restriction plate 53, a locking protrusion 57 is protruded. The locking protrusion 57 has a columnar shape having an outer diameter equal to the width of the elongated hole 27. Along the lower edge of the left end portion 53L, an arc-shaped curved restriction edge 59 is formed.

On a right end portion 53R of the restriction plate 53, a reception part 61 is formed. The reception part 61 has a pair of arms 63 facing in the width direction of the restriction plate 53. Between the arms 63, a gap G having a width through which the head portion 43b (see FIG. 2) of the moving side protrusion 43 (see FIG. 3) of the stopper 41 can be inserted is formed. In the middle portion of the gap G, a narrow portion 61a is formed in which the middle portions of both arms 63 are curved inward to narrow the width of the gap. A bottom portion 61b curved in an arc shape having a diameter equal to that of the head portion 43b is formed on a far side of the narrow portion 61a. Between almost the half portions of both arms 63 near the center of both arms 63, an elastic part 65 for preventing deformation of both arms 63 is integrally molded.

Figure 6:
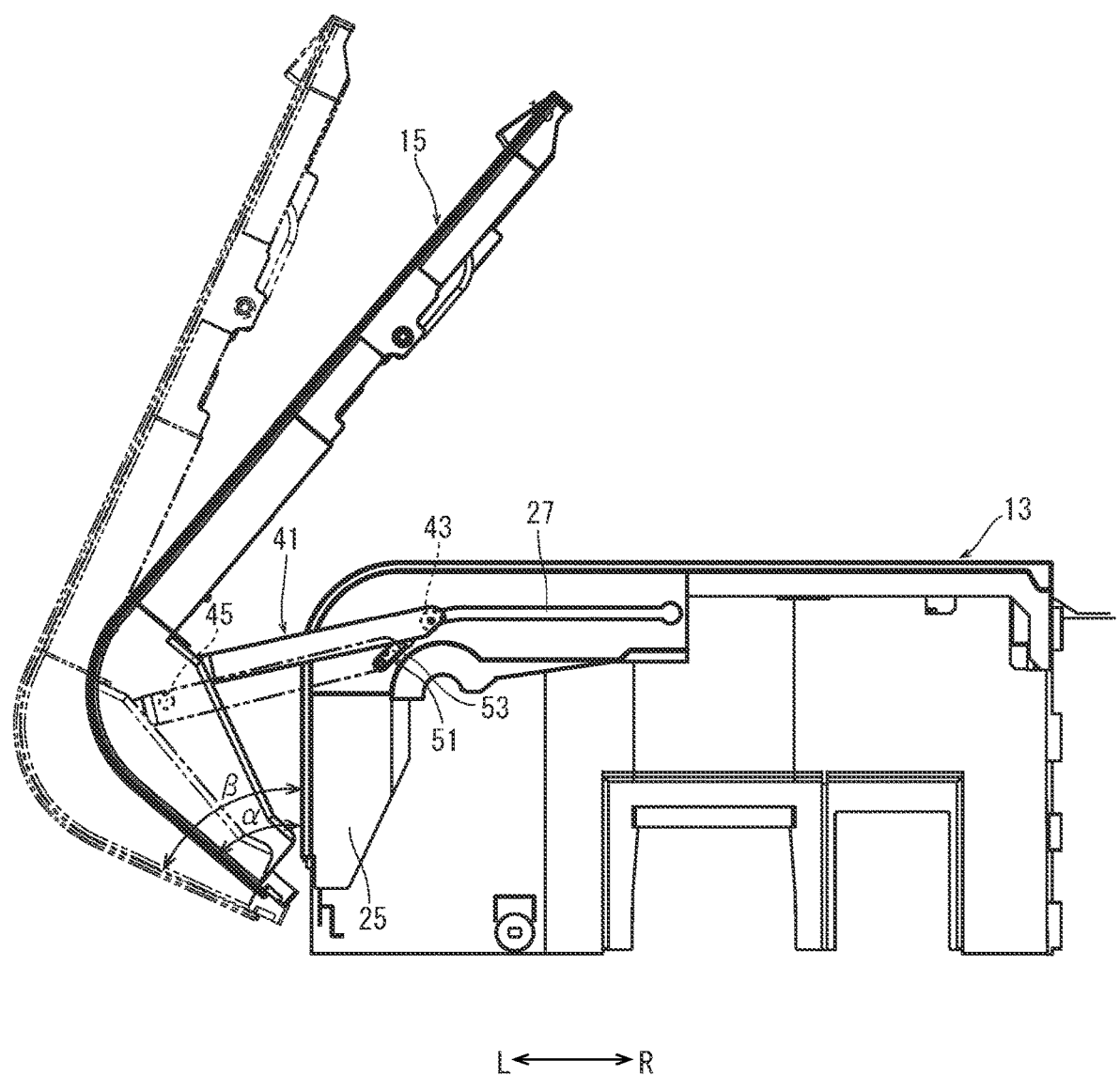
FIG. 6 is a front view showing the document cover (in the opening state) to which the restricting member is attached, in the document conveyance apparatus according to the embodiment of the present disclosure.
Figure 7A:
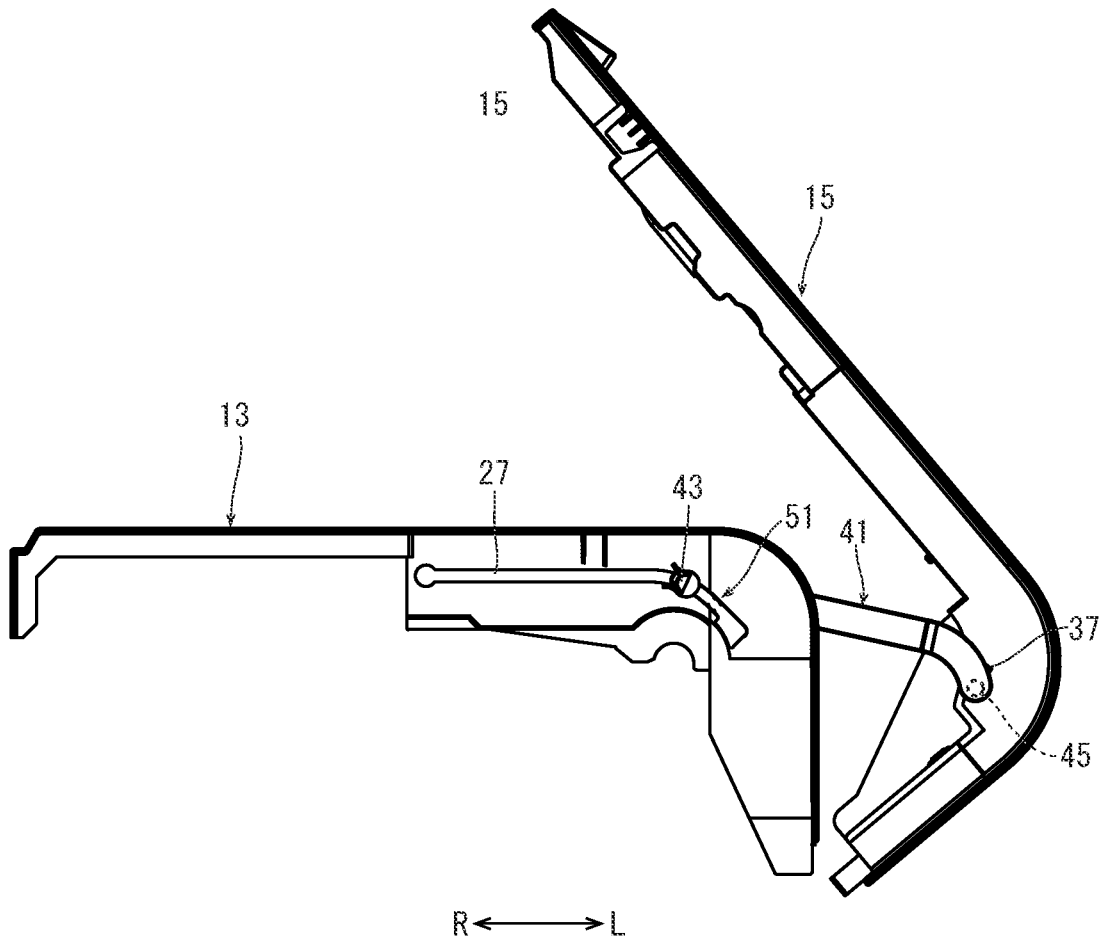
FIG. 7A is a back view showing the document cover (in the opening state) to which the restricting member is attached, in the document conveyance apparatus according to the embodiment of the present disclosure.

In the document conveyance apparatus 1 having the above configuration, an operation of the restriction member 51 will be described with reference to FIG. 6, FIG. 7A and FIG. 7B in addition to FIG. 5A and FIG. 5B. FIG. 6 is a front view showing the document cover 15 (in the opening state) for which the restriction means of the first example is applied. FIG. 7A is a view of the document cover 15 of FIG. 6 viewed from the rear side of the inner wall 25 of the rear cover 13, and FIG. 7B is an enlarged view of a part of FIG. 7A.

The restriction member 51 is attached to the elongated hole 27 from the rear side of the inner wall 25 of the rear cover 13. More specifically, with reference to FIG. 5A and FIG. 5B, the locking piece 55b of the retaining part 55 is firstly turned in a posture in which the longer side direction of the locking piece 55b is along the longer side direction of the restriction plate 53. Next, the retaining part 55 and the locking protrusion 57 are passed through the inclined portion 27b of the elongated hole 27 from the rear side of the inner wall 25, and as shown in FIG. 7B, the locking protrusion 57 is locked to the left end edge of the elongated hole 27. Then, the locking piece 55b of the retaining part 55 is turned approximately 90 degrees. Thereby, the locking piece 55b is locked to the inner wall 25, and the restriction member 51 is retained in the elongated hole 27. Further, the gap G between both arms 63 of the reception part 61 is disposed along the elongated hole 27, and the opening of the gap G communicates with the elongated hole 27. Further, the restriction edge 59 of the left end portion 53L comes into contact with the thick portion 25a of the inner wall 25 from the left side, thereby restricting the rightward movement of the restriction member 51 along the elongated hole 27.

In the state where the document cover 15 is turned downward, the moving side protrusion 43 of the stopper 41 is positioned near the circular portion 27c of the elongated hole 27 of the rear cover 13. That is, the position of the moving side projection 43 is the same as that shown in FIG. 4A in which the restriction member 51 is not attached. When the document cover 15 is turned upward for opening the conveyance path, the stopper 41 is pulled by the document cover 15 to which the fixing side protrusion 45 is locked and moved leftward, and the moving side protrusion 43 (the shaft portion 43a) is moved leftward in the elongated hole 27.

Figure 7B:
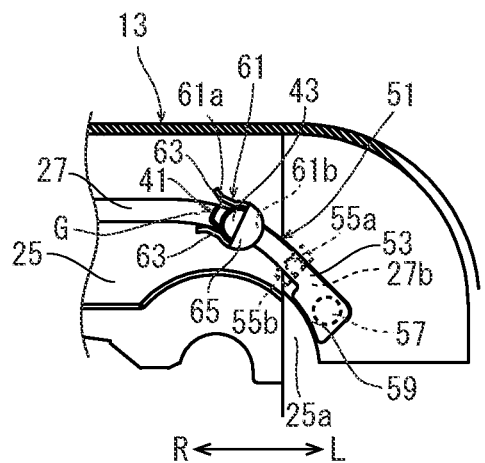
FIG. 7B is an enlarged back view showing a part of the document cover shown in FIG. 7A.

Then, as shown in FIG. 6, FIG. 7A, and FIG. 7B, the moving side protrusion 43 enters the reception part 61 of the restriction member 51. More specifically, the head portion 43b of the moving side protrusion 43 enters through the opening of the gap G between both arms 63, passes through the narrow portion 61a, and is received by the bottom portion 61b. The arms 63 of the reception part 61 elastically deform outward when the head portion 43b passes through the narrow portion 61a, and returns to the original shape after the head portion 43b is received by the bottom portion 61b. Thus, the head portion 43b received by the bottom portion 61b is hardly pulled out from the reception part 61. As described above, the head portion 43b is received by the reception part 61, so that the movement of the stopper 41 is restricted, and the turning of the document cover 15 is thus restricted. At this time, a moving amount of the moving side protrusion 43 along the elongated hole 27 becomes shorter by the length of the restriction member 51 along the inclined portion 27b of the elongated hole 27 as compared with a case where the restriction member 51 is not attached. Therefore, as shown in FIG. 6, when an opening angle of the document cover 15 is an angle between the left edge of the rear cover 13 and the left edge of the document cover 15, the opening angle α of the document cover 15 becomes smaller than the opening angle β of the document cover 15 when the moving side protrusion 43 is locked to the left end edge of the elongated hole 27 (see the two-dotted chain line in FIG. 6). Also in this case, since the center of gravity of the document cover 15 is positioned on the left side of the rotating shaft of the document cover 15, the document cover 15 is not closed by its own weight.

When the document cover 15 is turned downward, the stopper 41 is pushed by the document cover 15, and the moving side protrusion 43 moves rightward in the elongated hole 27. At this time, the head portion 43b of the moving side protrusion 43 is removed from the bottom portion 61b of the reception part 61 of the restriction member 51 through the narrow portion 61a, but since the restriction edge 59 of the restriction member 51 comes into contact with the thick portion 25a of the inner wall 25 from the left side to restrict the rightward movement of the restriction member 51, the restriction member 51 is not pulled by the moving side protrusion 43 and is maintained at the original position.

As described above, according to the document conveyance apparatus 1 of the present disclosure, by attaching the restriction member 51 in the elongated hole 27, it becomes possible to decrease the moving amount of the moving side protrusion 43 of the stopper 41 at the time of the turning of the document cover 15 and to decrease the opening angle of the document cover 15. Therefore, even if an apparatus such as a post-processing device is disposed on the left side of the document conveyance device 1, it becomes possible to prevent the opened document cover 15 from interfering with the apparatus disposed on the left side.

Further, since the restriction member 51 can be easily attached and detached, it can be used as needed. That is, in a usage environment in which it is not necessary to restrict the opening angle of the document cover 15, the restriction member 51 is not attached, and in a usage environment in which a post-processing apparatus or the like is disposed on the left side of the document conveyance apparatus 1, the restriction member 51 may be attached. Further, the restriction member 51 can also be applied to an existing document conveyance apparatus.

Figure 8:
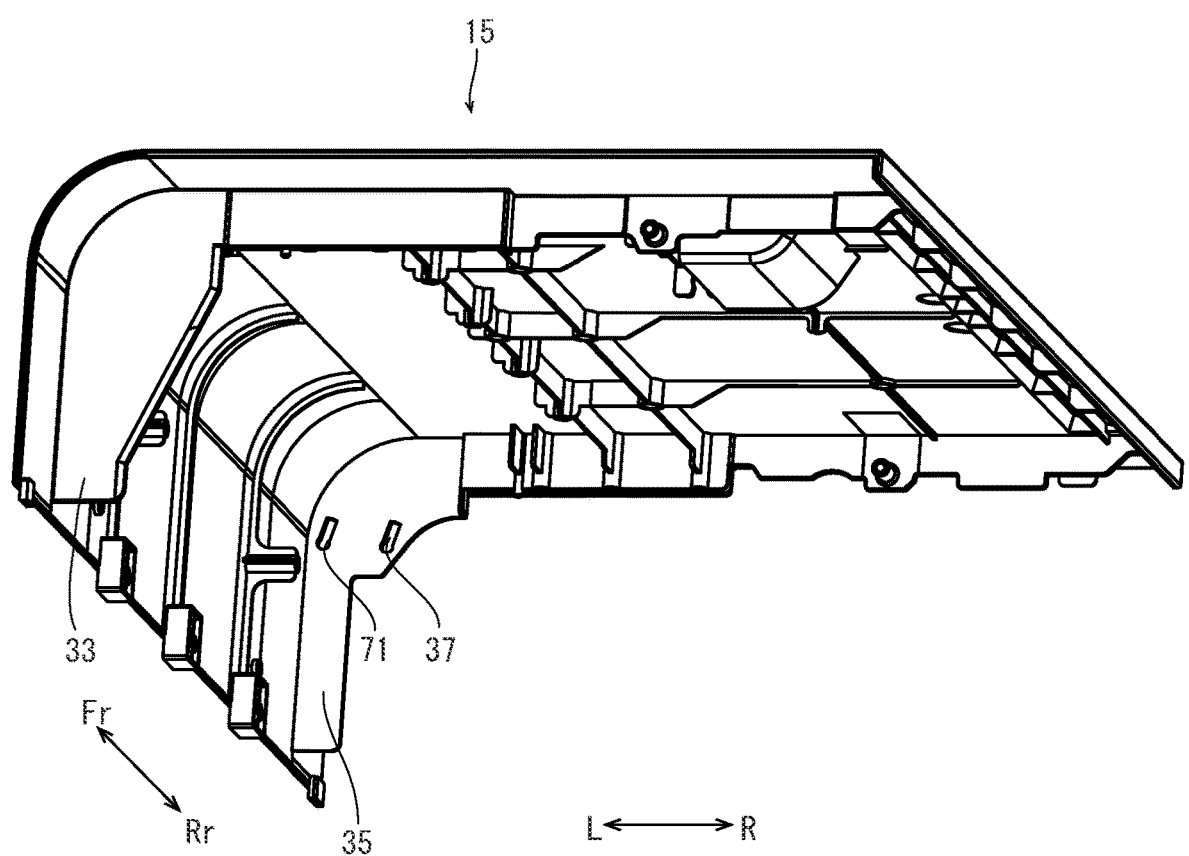
FIG. 8 is a perspective view showing the document cover having a restricting hole as a second restricting means, in the document conveyance apparatus according to the embodiment of the present disclosure.
Figure 9:
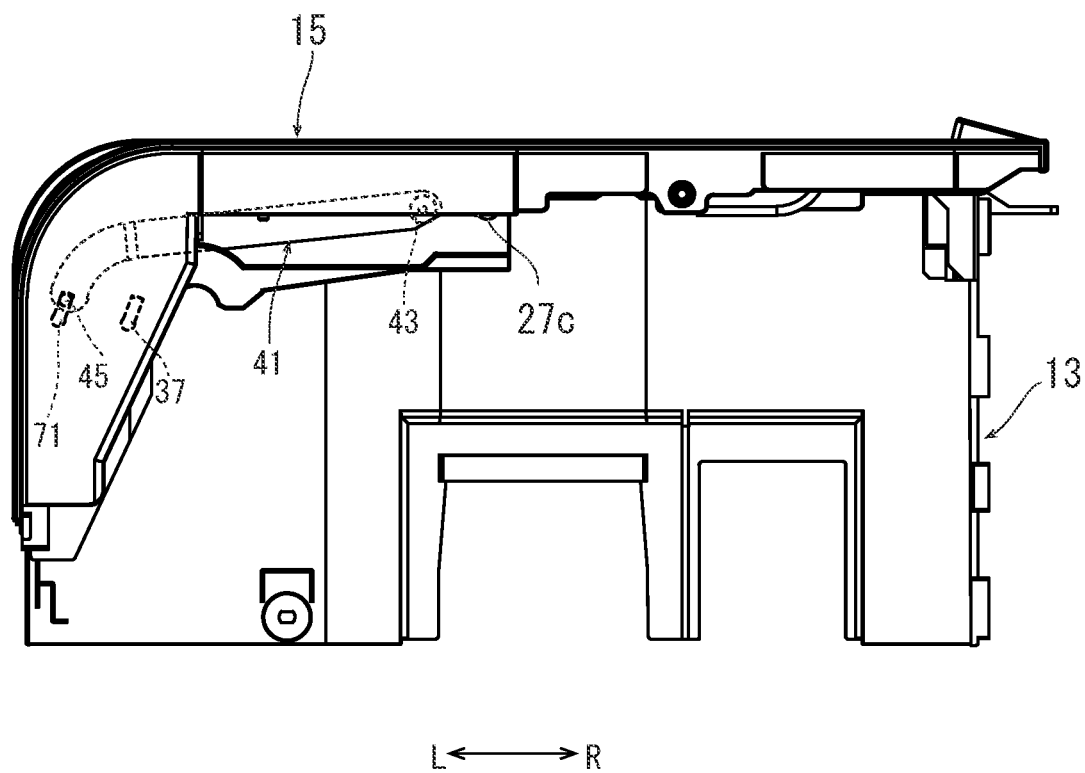
FIG. 9 is a perspective view showing the document cover (in the closing position) in a state where a fixing side protrusion of the stopper is engaged with the restricting hole, in the document conveyance apparatus according to the embodiment of the present disclosure.
Figure 10:
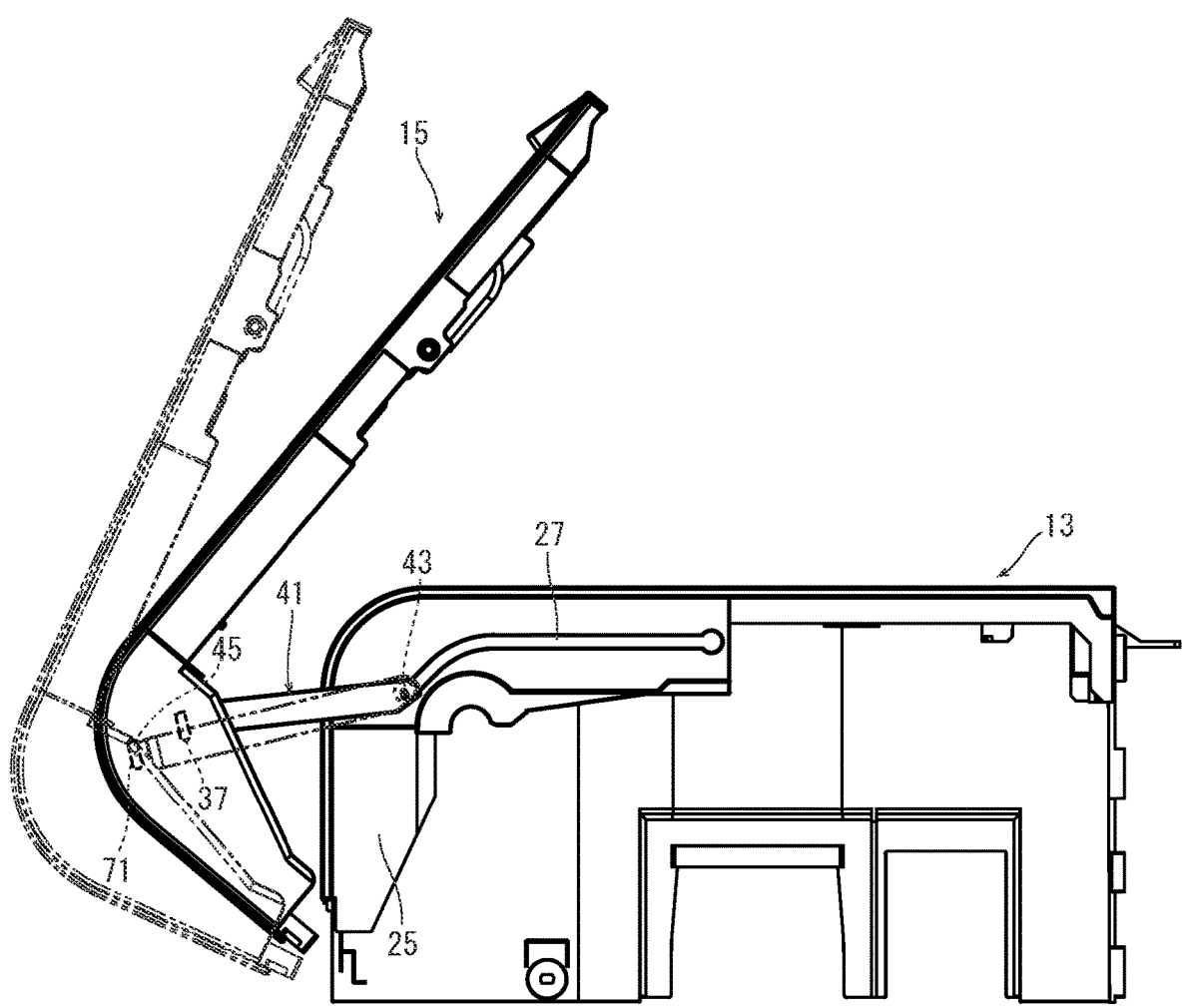
FIG. 10 is a front view showing the document cover (in the opening position) in a state where the fixing side protrusion of the stopper is engaged with the restricting hole, in the document conveyance apparatus according to the embodiment of the present disclosure.
Figure 11:
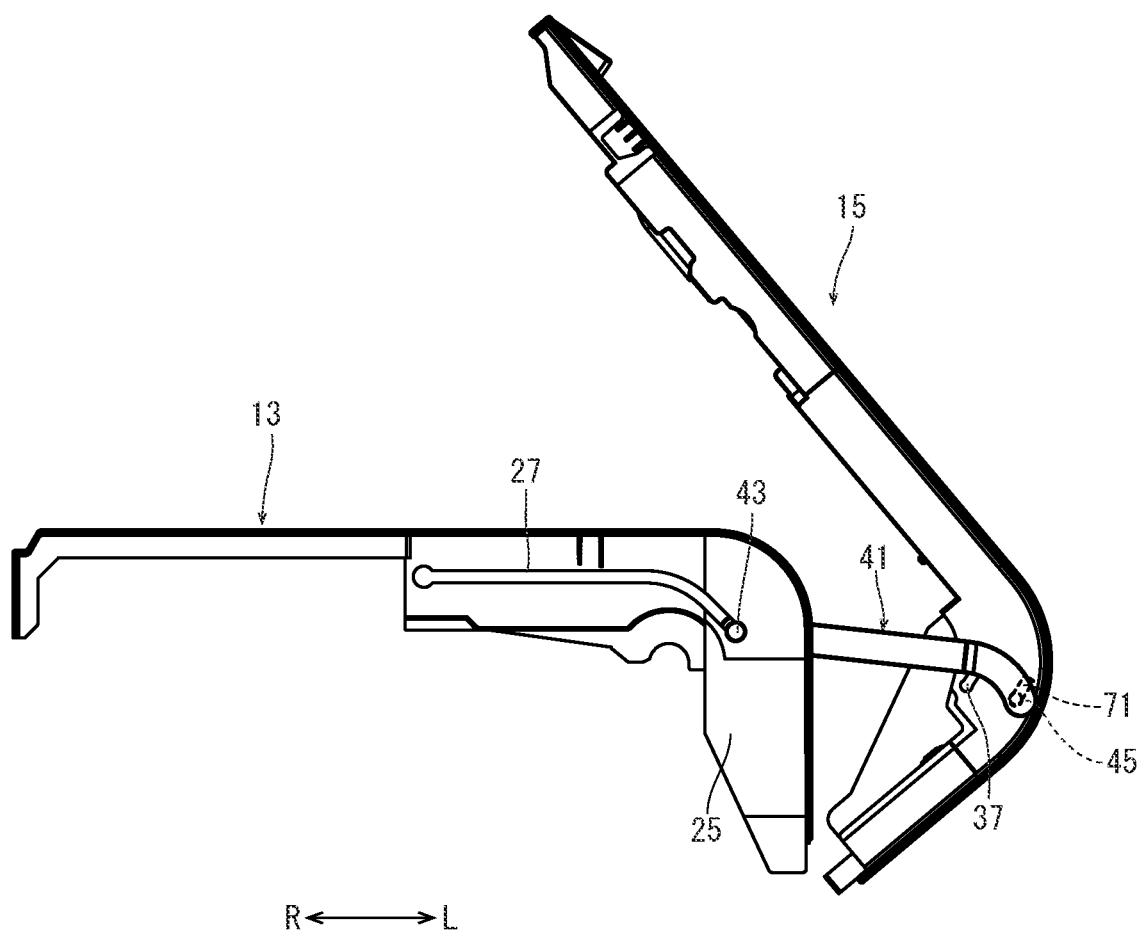
FIG. 11 is a back view showing the document cover (in the opening position) in a state where the fixing side protrusion of the stopper is engaged with the restricting hole, in the document conveyance apparatus according to the embodiment of the present disclosure.

Next, the regulation means according to a second example will be described with reference to FIG. 2 and FIG. 8 to FIG. 11. FIG. 8 is a perspective view showing the document cover 15 having a restriction hole 71 as the restriction means according to the second example. FIG. 9 is a front view showing the document cover 15 (in the closing state) when the restriction means of the second example is applied. FIG. 10 is a front view showing the document cover 15 (in the opening state) to which the restriction means of the second example is applied, and FIG. 11 is a view of the document cover 15 of FIG. 10 viewed from the rear side of the inner wall 25 of the rear cover 13.

As shown in FIG. 8, the restriction means according to the second example is a restriction hole 71 formed at a position (a position on the left side of the fixing hole 37) farther than the fixing hole 37 from the elongated hole 27 (see FIG. 2) of the document cover 15. The fixing side protrusion 45 of the stopper 41 is supported by the restriction hole 71. The moving side protrusion 43 of the stopper 41 is supported by the elongated hole 27 of the rear cover 13 in the same manner as in the above-described embodiment.

The restricting of the opening angle of the document cover 15 by the restriction means according to the second example will be described. As shown in FIG. 9, in the state where the document cover 15 is closed, the moving side protrusion 43 of the stopper 41 is positioned on the left side of the right end portion (the circular portion 27c) of the elongated hole 27 of the rear cover 13 at a predetermined distance. That is, since the restriction hole 71 to which the fixing side protrusion 45 of the stopper 41 is supported is formed at a position farther from the elongated hole 27 than the fixing hole 37, compared with a case where the fixing side protrusion 45 is supported by the fixing hole 37 (see FIG. 4A), the position of the moving side protrusion 43 is moved leftward by a distance between the restriction hole 71 and the fixing hole 37.

When the document cover 15 is turned upward, the stopper 41 is pulled by the document cover 15 to which the fixing side protrusion 45 is locked and moved leftward, and the moving side protrusion 43 moves leftward in the elongated hole 27. Then, as shown in FIG. 10, the moving side protrusion 43 is locked to the left end edge of the elongated hole 27. Thus, the movement of the stopper 41 is restricted, and the turning of the document cover 15 is restricted. In the above manner, the moving amount of the moving side protrusion 43 along the elongated hole 27 becomes shorter by the distance between the restriction hole 71 and the fixing hole 37 compared with a case where the fixing side protrusion 45 is supported by the fixing hole 37. Therefore, as compared with the case where the fixing side protrusion 45 of the stopper 41 is supported by the fixing hole 37 of the document cover 15 (see the two-dotted chain line in FIG. 10), the opening angle of the document cover 15 becomes smaller. Also in this case, since the center of gravity of the document cover 15 is located on the left side of the rotating shaft of the document cover 15, the document cover 15 is not closed by its own weight.

As described above, according to the restriction means of the second example, by disposing a position where the fixing side protrusion 45 is supported away from the elongated hole 27, it becomes possible to decrease the moving amount of the moving side protrusion 43 of the stopper 41, and to decrease the opening angle of the document cover 15. Therefore, even if an apparatus such as a post-processing apparatus is disposed on the left side of the document conveyance apparatus 1, it becomes possible to prevent the opened document cover 15 from interfering with the apparatus disposed on the left side.

In the second example, if the restriction hole 71 is formed in the document cover 15 in advance, the fixing side protrusion 45 of the stopper 41 is only detached from the fixing hole 37 and attached to the restriction hole 71 when necessary, so that relatively simple tasks are required. A plurality of the restriction holes 71 may be formed at positions having different distances from the elongate holes 27.

Next, modified examples will be described.

As a first modified example, the rear cover 13 is configured to be detachable from the base part 3, and another rear cover having an elongated hole having a length shorter than the elongated hole 27 is prepared. In this case, the shape and length of the elongated hole are substantially the same as the shape and length of the elongated hole when the restriction member 51 of the first example is attached. As the stopper, the same stopper 41 as in the above embodiment is prepared.

As a second modified example, a stopper having a length shorter than that of the standard stopper 41 is prepared. In this case, when the document cover 15 is closed, the moving side protrusion 43 is positioned in the elongated hole 27 on the left side as compared with the stopper 41 having a standard length.

Also in the above modified example, since the moving amount of the moving side protrusion 43 of the stopper 41 is decreased, the opening angle of the document cover 15 can be restricted to be small.

In the above embodiments, the document cover 15 has the fixing hole 37 and the conveyance part 5 (the rear cover 13) has the elongated hole 27. However, the document cover 15 may have the elongated hole 27 and the conveyance part 5 (the rear cover 13) may have the fixing hole 37.

While the present disclosure has been described with respect to specific embodiments, the present disclosure is not limited to the embodiments described above. Those skilled in the art can modify the above embodiments without departing from the scope and spirit of the present disclosure.

The invention claimed is:

1. A document conveyance apparatus comprising:
a conveyance part configured to have a conveyance path;
a document cover supported by the conveyance part, and opening and closing the conveyance path;
a stopper one end of which is rotatably supported by one of the conveyance part and the document cover and the other end of which is movably supported by an elongated hole formed in the other of the conveyance part and the document cover, the stopper supporting the document cover with respect to the conveyance part at a fixed opening angle when the other end is locked to one end edge of the elongated hole; and
a restriction member attached to the elongated hole on a side of the one end edge, wherein
when the restriction member is attached to the elongated hole on the side of the one end edge, a moving amount of the other end of the stopper along the elongated hole at a time of opening the document cover is restricted to be short so that the document cover is supported at an opening angle smaller than the fixed opening angle.

2. The document conveyance apparatus according to claim 1, wherein
the elongated hole is formed in the conveyance part.

3. The document conveyance apparatus according to claim 2, wherein
the elongated hole has a straight portion and an inclined portion inclined to the one end edge, and
the restriction member is attached to the inclined portion.

4. A document conveyance apparatus comprising:
a conveyance part configured to have a conveyance path;
a document cover supported by the conveyance part, and opening and closing the conveyance path; and
a stopper one end of which is rotatably supported by one of the conveyance part and the document cover and the other end of which is movably supported by an elongated hole formed in the other of the conveyance part and the document cover, the stopper supporting the document cover with respect to the conveyance part at a fixed opening angle when the other end is locked to one end edge of the elongated hole, wherein
when a position where the one end of the stopper is rotatably supported is shifted to a position far from the elongated hole, a moving amount of the other end of the stopper along the elongated hole at a time of opening the document cover is restricted to be short so that the document cover is supported at an opening angle smaller than the fixed opening angle.

* * * * *